(12) United States Patent
Grande et al.

(10) Patent No.: US 9,988,890 B2
(45) Date of Patent: Jun. 5, 2018

(54) SYSTEM AND A METHOD OF RECOVERING AND PROCESSING A HYDROCARBON MIXTURE FROM A SUBTERRANEAN FORMATION

(71) Applicant: STATOIL CANADA LIMITED, Calgary, Alberta (CA)

(72) Inventors: Knut Vebjørn Grande, Trondheim (NO); Karina Heitnes Hofstad, Ranheim (NO); Harald Vindspoll, Trondheim (NO); Marianne Haugan, Trondheim (NO)

(73) Assignee: STATOIL CANADA LIMITED, Calgary (CA)

( * ) Notice: Subject to any disclaimer, the term of this patent is extended or adjusted under 35 U.S.C. 154(b) by 66 days.

(21) Appl. No.: 14/412,963

(22) PCT Filed: Jul. 4, 2013

(86) PCT No.: PCT/EP2013/064204
§ 371 (c)(1),
(2) Date: Jan. 5, 2015

(87) PCT Pub. No.: WO2014/006169
PCT Pub. Date: Sep. 1, 2014

(65) Prior Publication Data
US 2015/0192007 A1    Jul. 9, 2015

(30) Foreign Application Priority Data

Jul. 6, 2012 (GB) .................................. 1212073.9

(51) Int. Cl.
*E21B 43/34* (2006.01)
*C10G 69/04* (2006.01)
(Continued)

(52) U.S. Cl.
CPC ................ *E21B 43/40* (2013.01); *C01B 3/36* (2013.01); *C01B 3/48* (2013.01); *C10G 1/002* (2013.01);
(Continued)

(58) Field of Classification Search
CPC ........ C10G 69/04; C10G 69/06; C10G 9/005; C10G 9/007; C10G 11/00; C10G 1/047;
(Continued)

(56) References Cited

U.S. PATENT DOCUMENTS 4,191,639 A * 3/1980 Audeh ............... B01D 11/0407
                                                      208/251 R
4,502,944 A * 3/1985 Nelson ................. C10G 21/003
                                                      208/309

(Continued)

FOREIGN PATENT DOCUMENTS

FR      2937648 A1 *  4/2010 ............... C01B 3/34
WO  WO 2009/003634 A1   1/2009
WO  WO 2012/090178 A1   7/2012

OTHER PUBLICATIONS

International Search Report issued in PCT/EP2013/064204, dated Oct. 17, 2013.

(Continued)

*Primary Examiner* — William D Hutton, Jr.
*Assistant Examiner* — Charles R Nold
(74) *Attorney, Agent, or Firm* — Birch, Stewart, Kolasch & Birch, LLP

(57) ABSTRACT

The present invention relates to a method and system for recovering and processing a hydrocarbon mixture from a subterranean formation. The method comprises: (i) mobilizing said hydrocarbon mixture; (ii) recovering said mobilized hydrocarbon mixture; (iii) deasphalting said recovered hydrocarbon mixture to produce deasphalted hydrocarbon (Continued)

and asphaltenes; (iv) gasifying said asphaltenes in a gasifier to generate hydrogen, steam and/or energy and $CO_2$; (v) upgrading said deasphalted hydrocarbon by hydrogen addition to produce upgraded hydrocarbon; and (vi) adding a diluent to said upgraded hydrocarbon, wherein said method is at least partially self-sufficient in terms of hydrogen and diluent.

35 Claims, 3 Drawing Sheets

(51) Int. Cl.

| | | |
|---|---|---|
| C10G 69/06 | (2006.01) | |
| C10G 47/00 | (2006.01) | |
| C10G 65/12 | (2006.01) | |
| C01B 3/34 | (2006.01) | |
| E21B 43/40 | (2006.01) | |
| C10G 67/04 | (2006.01) | |
| C10J 3/00 | (2006.01) | |
| C10G 21/00 | (2006.01) | |
| C10K 1/00 | (2006.01) | |
| C01B 3/36 | (2006.01) | |
| C01B 3/48 | (2006.01) | |
| E21B 43/24 | (2006.01) | |
| E21B 43/243 | (2006.01) | |
| C10G 1/00 | (2006.01) | |
| C10G 1/04 | (2006.01) | |
| C10J 3/60 | (2006.01) | |
| E21B 41/00 | (2006.01) | |
| E21B 43/16 | (2006.01) | |

(52) U.S. Cl.
CPC ............ *C10G 1/045* (2013.01); *C10G 21/003* (2013.01); *C10G 67/049* (2013.01); *C10G 67/0463* (2013.01); *C10J 3/00* (2013.01); *C10J 3/60* (2013.01); *C10K 1/005* (2013.01); *E21B 41/0064* (2013.01); *E21B 43/164* (2013.01); *E21B 43/24* (2013.01); *E21B 43/243* (2013.01); *E21B 43/2406* (2013.01); *E21B 43/2408* (2013.01); *C01B 2203/0255* (2013.01); *C01B 2203/0283* (2013.01); *C01B 2203/0415* (2013.01); *C01B 2203/0475* (2013.01); *C01B 2203/065* (2013.01); *C01B 2203/0894* (2013.01); *C01B 2203/86* (2013.01); *C10G 2300/4037* (2013.01); *C10G 2300/4043* (2013.01); *C10G 2300/42* (2013.01); *C10J 2300/0913* (2013.01); *C10J 2300/0959* (2013.01); *C10J 2300/1612* (2013.01); *C10J 2300/1656* (2013.01); *C10J 2300/1671* (2013.01); *C10J 2300/1678* (2013.01); *C10J 2300/1846* (2013.01); *Y02P 30/30* (2015.11); *Y02P 30/446* (2015.11)

(58) Field of Classification Search
CPC ........ C10G 2300/206; C10G 2300/208; C10G 2300/302; C10G 2300/308; C10G 45/00; C10G 47/00; C10G 47/02; C10G 55/06; C10G 65/12; C10G 67/04; C10G 67/0454; C10G 9/00; C01B 2203/0205; C01B 2203/0475; C01B 2203/84; C01B 3/34; E21B 43/24; E21B 43/2406; E21B 43/34

See application file for complete search history.

(56) References Cited

U.S. PATENT DOCUMENTS

| | | | | |
|---|---|---|---|---|
| 4,514,283 | A * | 4/1985 | Closmann | C10G 53/04 208/370 |
| 4,550,779 | A * | 11/1985 | Zakiewicz | E21B 33/138 166/248 |
| 4,778,586 | A * | 10/1988 | Bain | C10G 9/007 137/13 |
| 6,357,526 | B1 | 3/2002 | Abdel-Halim et al. | |
| 2006/0042999 | A1* | 3/2006 | Iqbal | C10G 67/04 208/86 |
| 2007/0045155 | A1* | 3/2007 | Selmen | C10G 1/047 208/49 |
| 2008/0083653 | A1* | 4/2008 | Bruha | C10G 11/18 208/106 |
| 2008/0289821 | A1 | 11/2008 | Betzer Tsilevich | |
| 2008/0289999 | A1* | 11/2008 | Lenglet | C10G 65/18 208/309 |
| 2009/0020456 | A1* | 1/2009 | Tsangaris | C10G 2/30 208/133 |
| 2010/0155062 | A1* | 6/2010 | Boone | C09K 8/58 166/272.3 |
| 2010/0200227 | A1* | 8/2010 | Satchell, Jr. | E21B 43/34 166/256 |
| 2011/0266196 | A1* | 11/2011 | Gauthier | C01B 3/34 208/95 |
| 2012/0012503 | A1 | 1/2012 | Flint et al. | |

OTHER PUBLICATIONS

Search Report of Great Britain application No. GB1212073.9 dated Aug. 13, 2012.
Written Opinion of the International Searching Authority issued in PCT/EP2013/064204, dated Oct. 17, 2013.

* cited by examiner

SYSTEM AND A METHOD OF RECOVERING AND PROCESSING A HYDROCARBON MIXTURE FROM A SUBTERRANEAN FORMATION

FIELD OF THE INVENTION

The present invention relates to a method of recovering a hydrocarbon mixture, especially a heavy hydrocarbon mixture, from a subterranean formation and to processing the hydrocarbon mixture to a transportable product. A feature of the present invention is that the hydrocarbon mixture is upgraded by hydrogen addition and that the method is at least partially self-sufficient in terms of hydrogen. The invention further relates to systems for carrying out the method of the invention.

BACKGROUND

Heavy hydrocarbons, e.g. bitumen, represent a huge natural source of the world's total potential reserves of oil. Present estimates place the quantity of heavy hydrocarbon reserves at several trillion barrels, more than 5 times the known amount of the conventional, i.e. non-heavy, hydrocarbon reserves. This is partly because heavy hydrocarbons are generally difficult to recover by conventional recovery processes and thus have not been exploited to the same extent as non-heavy hydrocarbons. Heavy hydrocarbons possess very high viscosities and low API (American Petroleum Institute) gravities which makes them difficult, if not impossible, to pump in their native state. Additionally heavy hydrocarbons are characterised by high levels of unwanted compounds such as asphaltenes, trace metals and sulphur that need to be processed appropriately during recovery and/or refining.

A number of methods have been developed to extract and process heavy hydrocarbon mixtures. The recovery of heavy hydrocarbons from subterranean reservoirs is most commonly carried out by steam assisted gravity drainage (SAGD) or in situ combustion (ISC). In these methods the heavy hydrocarbon is heated and thereby mobilised, by steam in the case of SAGD and by a combustion front in the case of ISC, to flow to a production well from where it can be pumped to the surface facilities. The transportability of the viscous heavy hydrocarbon mixture recovered is conventionally improved by dilution with a lighter hydrocarbon.

Another approach that has previously been adopted to improve the transportability of crude heavy hydrocarbon is to upgrade heavy hydrocarbon mixtures on site prior to transportation to a refinery. Thus a heavy hydrocarbon mixture recovered from a well may be upgraded to form lighter oil having an API of about 20-35 degrees on site and then pumped to a refinery. In such a set up, the upgrading is typically carried out by thermal cracking and/or hydrocracking.

The SAGD and ISC based processes currently used suffer from inherent drawbacks. These include:
(i) diluent is often added to transport the recovered hydrocarbon to refineries therefore large volumes of diluent must be transported and stored at extraction sites;
(ii) if upgrading is used to improve transportability, there is a need to transport significant amounts of fuel and/or hydrogen for use in the upgrading processes to the well site;
(iii) higher levels of asphaltenes are present in the recovered hydrocarbon than non-heavy hydrocarbon and it has little commercial value;
(iv) the use of natural gas for steam generation for SAGD causes high $CO_2$ emissions whereas it has already been recognised in the energy industry that $CO_2$ emissions must be managed better; and
(v) ISC generates vast quantities of $CO_2$ whereas, as above, $CO_2$ emissions must be controlled.

There have been a number of attempts in the prior art to alleviate or minimise the above-mentioned disadvantages of conventional SAGD and ISC processing. US 2006/0042999, U.S. Pat. No. 6,357,526 and WO2012/090178, for example, disclose processes for producing heavy oil by SAGD wherein asphaltenes are separated from the crude heavy hydrocarbon and are used to generate steam and/or hydrogen. Nevertheless a need still exists for recovery processes for hydrocarbon mixtures, and especially heavy hydrocarbon mixtures, which are less demanding in terms of external chemicals required to make the mixture transportable. Methods that additionally reduce the need for steam would naturally be particularly beneficial.

The present inventors have now devised a method of recovering and processing a hydrocarbon mixture wherein at least some of the hydrogen generated from gasification of a part of the recovered hydrocarbon mixture is used in upgrading and another part of the recovered hydrocarbon mixture is used as a diluent in the processing of the recovered hydrocarbon mixture. The method of the present invention is therefore at least partially self-sufficient in terms of hydrogen and also diluent.

SUMMARY OF INVENTION

Thus viewed from a first aspect the present invention provides a method of recovering and processing a hydrocarbon mixture from a subterranean formation, comprising:
(i) mobilising said hydrocarbon mixture;
(ii) recovering said mobilised hydrocarbon mixture;
(iii) deasphalting said recovered hydrocarbon mixture to produce deasphalted hydrocarbon and asphaltenes;
(iv) gasifying said asphaltenes in a gasifier to generate hydrogen, steam and/or energy and $CO_2$; (v) upgrading said deasphalted hydrocarbon by hydrogen addition to produce upgraded hydrocarbon,
(vi) adding a diluent to said upgraded hydrocarbon,
wherein said method is at least partially self-sufficient in terms of hydrogen and diluent.

Viewed from a further aspect the present invention provides a system for recovering and processing a hydrocarbon mixture comprising:
(a) a well arrangement for a method of recovering hydrocarbon mixture comprising a production well;
(b) a fractionator having an inlet for hydrocarbon mixture fluidly connected to the well arrangement, an outlet for a heavier fraction fluidly connected to a deasphalter unit and an outlet for at least one lighter fraction;
(c) a deasphalter unit fluidly connected to said fractionator and having an outlet for deasphalted hydrocarbon and an outlet for asphaltenes;
(d) a gasifier fluidly connected to said outlet for asphaltenes of said deasphalter unit and having an outlet for steam and/or a means to store energy and an outlet for $CO_2$;
(e) an upgrader fluidly connected to said outlet for deasphalted hydrocarbon of said deasphalter unit and having an inlet for hydrogen and an outlet for upgraded hydrocarbon;
(f) a diluent addition tank fluidly connected to the outlet for upgraded hydrocarbon of said upgrader and having an inlet for diluent and an outlet for syncrude;

(g) a means for transporting hydrogen generated by said gasifier to said inlet for hydrogen of said upgrader; and
(h) a means for transporting said at least one lighter fraction from said fractionator to said inlet for diluent of said diluent addition tank.

DESCRIPTION OF INVENTION

The methods of the present invention are at least partially self-sufficient or self-supporting. As used herein the terms self-sufficient and self-supporting refer to the fact that the method provides or generates a proportion of its own raw materials and/or energy. The methods of the present invention are at least partially self-sufficient in terms of hydrogen and diluent. Preferably the methods generate at least some of the hydrogen required for upgrading from asphaltenes obtained from the hydrocarbon mixture, i.e. some of the hydrogen for upgrading is not from an external source. More preferably at least some of the hydrogen for upgrading is hydrogen generated in the gasifying step. Preferably the methods generate at least some, preferably substantially all, e.g. all, of the diluent required for processing from the recovered hydrocarbon mixture. Preferred methods of the invention are also at least partially self-sufficient in terms of steam, water, and/or solvent for deasphalting.

As used herein the term "upgrading" refers to a process wherein the hydrocarbon mixture is altered to have more desirable properties, e.g. to providing lighter, synthetic crude oils from heavier hydrocarbon mixtures by chemical processes. The term upgrading therefore encompasses processes wherein the average molecular weight of the hydrocarbons present in the upgraded hydrocarbon mixture is lower than the average molecular weight of the hydrocarbons in the heavy hydrocarbon starting mixture. The term also encompasses processes wherein the hydrocarbon mixture is stabilised. In such processes, the level of unsaturation in the hydrocarbon mixture is reduced.

The methods of the present invention are concerned with the recovery and processing of a hydrocarbon mixture. As used herein, the term "hydrocarbon mixture" is used to refer to a combination of different hydrocarbons, i.e. to a combination of various types of molecules that contain carbon atoms and, in many cases, attached hydrogen atoms. A "hydrocarbon mixture" may comprise a large number of different molecules having a wide range of molecular weights. Generally at least 90% by weight of the hydrocarbon mixture consists of carbon and hydrogen atoms. Up to 10% by weight may be present as sulphur, nitrogen and oxygen as well as metals such as iron, nickel and vanadium (i.e. as measured sulphur, nitrogen, oxygen or metals). These are generally present in the form of impurities of the desired hydrocarbon mixture.

The methods of the present invention are particularly useful in the recovery and processing of heavy hydrocarbon mixtures. A heavy hydrocarbon mixture comprises a greater proportion of hydrocarbons having a higher molecular weight than a relatively lighter hydrocarbon mixture. Terms such as "light", "lighter", "heavier" etc. are to be interpreted herein relative to "heavy".

As used herein a heavy hydrocarbon mixture preferably has an API gravity of less than about 20°, preferably less than about 15°, more preferably less than 12°, still more preferably less than 10°, e.g. less than 8°. It is particularly preferred if the API gravity of the heavy hydrocarbon mixture recovered and processed by the method of the present invention is from about 5° to about 15°, more preferably from about 6° to about 12°, still more preferably about 7° to about 12°, e.g. about 7.5-9°. At such API gravities, viscosity and flowability are matters of concern.

The viscosity of a heavy hydrocarbon mixture may be as high as 1,000,000 cP at formation temperature and pressure. Heavy hydrocarbon mixtures having these API gravities and/or viscosities tend to comprise significant amounts of aromatic and naphthalenic compounds, as well as sulphur compounds, making hydrocarbon recovery and processing particularly problematic.

Examples of heavy hydrocarbon mixtures that typically have API gravities and/or viscosities falling in the above-mentioned ranges are bitumens, tars, oil shales and oil sand deposits.

The crude hydrocarbon mixture, e.g. heavy hydrocarbon, recovered and processed by the method of the present invention may be obtained using any steam-based recovery technique or by in situ combustion (ISC). Representative examples of steam-based techniques that may be used to recover heavy hydrocarbon mixtures include steam assisted gravity drainage (SAGD), hot solvent extraction, VAPEX, cyclic steam stimulation (CSS) and combinations thereof. The method of the present invention is, however, particularly useful when SAGD or ISC is the recovery method, especially SAGD.

In SAGD two horizontal wells, typically referred to as an injection well and a producer well, are drilled into the reservoir, vertically separated by, e.g. 5-10 meters. This group of two wells is typically referred to as a well pair or a SAGD well pair. Steam is injected into the upper injection well, flows outward, contacts the hydrocarbon above it, condenses and transfers its latent heat to the hydrocarbon. This heating reduces the viscosity of the hydrocarbon, its mobility increases and it flows due to gravity to the lower producer well from where it can be produced.

Thus in the methods of the present invention the steam-based method of recovering a hydrocarbon mixture is preferably SAGD. Preferably the step of mobilising hydrocarbon is carried out by injecting steam into the formation via the injection well of a SAGD well pair. Preferably the step of recovering the mobilised hydrocarbon mixture is carried out by pumping it from the producer well of a SAGD well pair. SAGD is preferably carried out using conventional equipment and under conventional conditions.

In ISC a row of vertical injection wells are drilled into the reservoir, along with a row of vertical vent wells. Preferably the vent wells are laterally spaced from the injection wells so that the rows of injection wells and rows of vent wells are parallel. A horizontal production well is also drilled in the reservoir and is preferably aligned with, and positioned below, the row of injection wells. The production well is preferably located in a lower region of the oil-bearing formation.

Preferably the step of mobilising hydrocarbon is carried out by injecting an oxygen-containing gas into the formation via the injection wells to initiate combustion. This generates a combustion zone that heats heavy hydrocarbon in its vicinity thereby increasing the hydrocarbon mobility and enabling it to flow. Under the forces of gravity, the heavy hydrocarbon flows downwards towards the production well. Preferably the step of recovering the mobilised hydrocarbon mixture is carried out by pumping it from the production well of an in situ combustion well arrangement.

In the methods of the present invention, the gas injected into the formation in ISC is an oxygen-containing gas, e.g. air. More preferably, however, the oxygen-containing gas is an oxygen-rich gas. As used herein, the term "oxygen-rich gas" is used to refer to an oxygen-containing gas comprising at least 25% by volume oxygen and/or $CO_2$. A preferred oxygen-rich gas for use in the methods of the present invention comprises at least 25% by volume oxygen. Particularly preferred oxygen-rich gases comprise at least 30% by volume, more preferably at least 40% by volume oxygen. Particularly preferred oxygen-rich gas comprises 25-100% by volume oxygen, more preferably 30-90% by volume oxygen, still more preferably 40-85% by volume oxygen, e.g. about 50 to 80% by volume oxygen or about 50 to 70% by volume oxygen. In preferred methods of the invention, the oxygen-rich gas additionally comprises $CO_2$. Particularly preferably the oxygen-rich gas consists essentially of (e.g. consists of) oxygen and $CO_2$. Particularly preferably the oxygen-rich gas does not comprise nitrogen or any nitrogen-containing gas, especially nitrogen. Preferably the oxygen-rich gas comprises less than 10% by volume nitrogen, more preferably less than 5% by volume nitrogen, still more preferably less than 2% by volume nitrogen, e.g. less than 1% by volume nitrogen. In preferred methods of the invention, the oxygen-rich gas comprises at least 5% by volume $CO_2$, more preferably at least 10% by volume $CO_2$ and still more preferably at least 15% by volume $CO_2$. Particularly preferably the amount of $CO_2$ in the oxygen-rich gas is in the range 0-50% by volume, more preferably 5 to 30% by volume, still more preferably 10 to 20% by volume.

Preferably the oxygen-rich gas is an oxygen and $CO_2$ mixture. Preferred oxygen and $CO_2$ mixtures consist of oxygen and $CO_2$. Particularly preferred oxygen and $CO_2$ mixtures comprise 50-95% by volume oxygen and 50-5% by volume $CO_2$, more preferably 60-85% oxygen and 40-15% by volume $CO_2$, still more preferably 70-80% by volume oxygen and 30-20% by volume $CO_2$. An example of a preferred oxygen and $CO_2$ mixture is 60-70% oxygen and 40-30% $CO_2$% by volume. Particularly preferably the oxygen-rich gas comprises oxygen and $CO_2$ in a ratio of 50:50 to 99:1 by volume, more preferably 70:30 to 95:5 by volume.

The mobilised hydrocarbon mixture recovered at the surface by ISC or by steam based methods, e.g. SAGD, is typically in the form of a mixture with water. Prior to carrying out the deasphalting step of the method of the present invention a diluent may be added to the hydrocarbon mixture recovered from the formation. Diluent addition may be advantageous if, e.g. the crude heavy hydrocarbon mixture is unstable. Diluent addition may also be used to adjust the API of the crude hydrocarbon mixture into a range in which crude hydrocarbon and water can be easily separated. Diluent addition may, for example, be carried out to adjust the API of the crude hydrocarbon mixture to about 15-20°. Diluent is preferably added to the mobilised hydrocarbon mixture prior to a separation.

The diluent added to the crude hydrocarbon mixture is preferably a diluent, e.g. comprising naphtha, kerosene, light gas oils and/or heavy gas oils, obtained by fractionating the hydrocarbon mixture. This is discussed below in more detail. In this sense the method of the present invention is preferably at least partially self-sufficient or self-supporting in terms of diluent for addition to the recovered hydrocarbon mixture. This reduces or avoids the need to transport and store external diluent on site for this purpose.

Another step that is preferably carried out prior to deasphalting is separation. If diluent addition to the crude hydrocarbon mixture is carried out, diluent addition may be done before or after separation. Preferably, however, diluent addition is carried out before separation as it generally improves the performance of the separation.

Preferred methods of the invention therefore comprise the step of separating the mobilised hydrocarbon mixture comprising hydrocarbons and water to produce separated water and separated hydrocarbon. A bulk separator may be used to carry out the bulk separation on the hydrocarbon and water mixture. Different types of separator are available, e.g. a gravity separator, a cyclone separator or a vortex separator. Preferably, however, the separator is a gravity separator. The separator optionally includes means for separation of gas from the mixture. The separator optionally includes means for separation of solids from the mixture.

In the bulk separator the hydrocarbon and water mixture is separated to yield separated hydrocarbon and separated water. The mixture is fed into the bulk separator and allowed, for example, to separate out to a gas phase, a hydrocarbon phase, a water phase and a solids phase in vertically descending order. Optionally chemicals such as emulsion breakers may be added to the separator to improve the separation.

Preferred methods of the invention therefore comprise:
(i) mobilising said hydrocarbon mixture;
(ii) recovering said mobilised hydrocarbon mixture, wherein said mobilised hydrocarbon mixture comprises water and hydrocarbon;
(iii) separating said mobilised hydrocarbon mixture to produce separated water and separated hydrocarbon, wherein a diluent is added to said mobilised hydrocarbon mixture prior to said separation;
(iv) deasphalting said separated hydrocarbon to produce deasphalted hydrocarbon and asphaltenes;
(iv) gasifying said asphaltenes in a gasifier to generate hydrogen, steam and/or energy and $CO_2$;
(v) upgrading said deasphalted hydrocarbon by hydrogen addition to produce upgraded hydrocarbon; and
(vi) adding a diluent to said upgraded hydrocarbon
wherein said method is at least partially self-sufficient in terms of hydrogen and diluent. The separated water predominantly comprises water but generally also contains impurities such as hydrocarbon and dissolved organics and inorganics. Preferably the separated water is cleaned and recycled for use in steam generation. Particularly preferably the separated water is converted to steam using energy generated in the gasifying step. Preferably the steam generated is reinjected into a formation.

Conventional methods may be used to clean the water to the necessary level for entry into steam generators. An advantage of the method of the invention is therefore that water can be recycled and hence the amount of fresh water required is minimised. In this sense the preferred methods of the present invention are self-sufficient or self-supporting in terms of water.

The separated hydrocarbon predominantly comprises hydrocarbon. As explained above, this hydrocarbon is a mixture of different hydrocarbons. Preferably at least 75% by volume, more preferably at least 85% by volume and still more preferably at least 95% by volume of the separated hydrocarbon is hydrocarbon mixture.

The recovered, and preferably separated, hydrocarbon mixture is preferably transported to a fractionating column or fractionator. A conventional fractionator, well known in the petroleum industry, may be used. Thus a preferred method of the invention comprises fractionating the recovered hydrocarbon mixture, preferably separated hydrocarbon, prior to the deasphalting. Preferably separation is carried out prior to fractionating. Preferably at least one lighter fraction, e.g. comprising naphtha, kerosene and/or light gas oils, is removed from the mobilised hydrocarbon mixture during the fractionation. Preferably an even lighter fraction, e.g. comprising $C_{3-6}$ hydrocarbons, is also removed from the hydrocarbon mixture during fractionation. Preferably fractionation produces a heavier fraction and at least one lighter fraction. Preferably the afore-mentioned diluent comprises the lighter fraction obtained during fractionation.

Thus a preferred method of the present invention comprises:
(i) mobilising said hydrocarbon mixture;
(ii) recovering said mobilised hydrocarbon mixture;
(iii) fractionating said recovered hydrocarbon mixture to produce a heavier fraction and at least one lighter fraction;
(iv) deasphalting said heavier fraction to produce deasphalted hydrocarbon and asphaltenes;
(v) gasifying said asphaltenes in a gasifier to generate hydrogen, steam and/or energy and $CO_2$;
(vi) upgrading said deasphalted hydrocarbon by hydrogen addition to produce upgraded hydrocarbon; and
(vii) adding a diluent to said upgraded hydrocarbon;
wherein said method is at least partially self-sufficient in terms of hydrogen and wherein said diluent comprises a lighter fraction obtained during fractionating. Particularly preferably the at least one lighter fraction obtained by fractionation comprises a significant proportion of naphtha, e.g. at least 20% by weight of the mixture is naphtha. Preferably, the lighter hydrocarbon mixture comprises 10 to 50% wt by weight, of naphtha.

Particularly preferably the at least one lighter fraction obtained by fractionation also comprises a large proportion of middle distillate, e.g. at least 30% by weight of the mixture is kerosene, light gas oil and heavy gas oil. Preferably, the lighter hydrocarbon mixture comprises 50 to 90% by weight, of middle distillate. By "kerosene" is meant a hydrocarbon fraction having a boiling point between about 180° C. and 240° C.; by "light gas oil" is meant a hydrocarbon fraction having a boiling point between about 240° C. and 320° C., and by "heavy gas oil" is meant a hydrocarbon fraction having a boiling point between about 320° C. and 400° C.

The lighter fraction will generally contain the majority of any diluent added to the crude hydrocarbon mixture, e.g. prior to separation. This lighter fraction is preferably used or recycled as diluent for addition to further crude hydrocarbon mixture. The diluent may be added to the separator and/or to a line transporting crude hydrocarbon mixture to the separator.

The methods of the present invention comprise adding a diluent to the upgraded hydrocarbon. Preferred methods of the present invention further comprise adding a diluent to the deasphalted hydrocarbon prior to upgrading and/or during upgrading. Preferably the method of the invention is at least partially self-sufficient in terms of this diluent. Preferably the diluent added to the deasphalted and/or upgraded hydrocarbon comprises a lighter fraction, e.g. comprising naphtha, kerosene, light gas oils and/or heavy gas oils, obtained during fractionating. An advantage of the method of the invention is therefore that the crude hydrocarbon mixture extracted from the formation supplies at least some of the diluent required for its processing. Preferably substantially all, e.g. all, of the diluent required for processing derives from the hydrocarbon mixture extracted from the formation.

Thus a preferred method of the present invention comprises:
(i) mobilising said hydrocarbon mixture;
(ii) recovering said mobilised hydrocarbon mixture;
(iii) deasphalting said recovered hydrocarbon mixture to produce deasphalted hydrocarbon and asphaltenes;
(iv) gasifying said asphaltenes in a gasifier to generate hydrogen, steam and/or energy and $CO_2$;
(v) adding a diluent to said deasphalted hydrocarbon;
(vi) upgrading said deasphalted hydrocarbon by hydrogen addition to produce upgraded hydrocarbon; and
(vii) adding a diluent to said upgraded hydrocarbon;
wherein said method is at least partially self-sufficient in terms of hydrogen and diluent. A further preferred method of the invention comprises:
(i) mobilising said hydrocarbon mixture;
(ii) recovering said mobilised hydrocarbon mixture;
(iii) fractionating said recovered hydrocarbon mixture to produce a heavier fraction and at least one lighter fraction from said recovered hydrocarbon mixture;
(iv) deasphalting said heavier fraction to produce deasphalted hydrocarbon and asphaltenes;
(v) gasifying said asphaltenes in a gasifier to generate hydrogen, steam and/or energy and $CO_2$;
(vi) adding diluent to said deasphalted hydrocarbon;
(vii) upgrading said deasphalted hydrocarbon by hydrogen addition to produce upgraded hydrocarbon; and
(viii) adding diluent to said upgraded hydrocarbon;
wherein at least some of said hydrogen for upgrading is hydrogen generated in the gasifying step and wherein at least some of said diluent comprises a lighter fraction obtained during fractionating.

A particularly preferred method of the invention comprises:
(i) mobilising said hydrocarbon mixture;
(ii) recovering said mobilised hydrocarbon mixture, wherein said mobilised hydrocarbon mixture comprises water and hydrocarbon;
(iii) separating said mobilised hydrocarbon mixture to produce separated water and separated hydrocarbon, wherein a diluent is added to said mobilised hydrocarbon mixture prior to said separation;
(iv) fractionating said separated hydrocarbon to produce at least one heavier fraction and at least one lighter fraction;
(v) deasphalting said heavier fraction to produce deasphalted hydrocarbon and asphaltenes;
(vi) gasifying said asphaltenes in a gasifier to generate hydrogen, steam and/or energy and $CO_2$;
(vii) adding diluent to said deasphalted hydrocarbon;
(viii) upgrading said deasphalted hydrocarbon by hydrogen addition to produce upgraded hydrocarbon; and
(ix) adding diluent to said upgraded hydrocarbon
wherein at least some of said hydrogen for upgrading is hydrogen generated in the gasifying step and wherein at least some of said diluent comprises said lighter fraction obtained during fractionating.

In a preferred method of the present invention, an even lighter fraction is also removed from the hydrocarbon mixture during fractionation. Preferably the even lighter fraction comprises a large proportion of $C_{3-6}$ hydrocarbons, e.g. at least 50% by weight of the mixture is propane, butane, pentane and/or hexane. The upper limit on the amount of $C_{3-6}$ hydrocarbons present may be, e.g. 95% by weight.

In the method of the present invention the recovered hydrocarbon mixture is deasphalted. Preferably the hydrocarbon mixture that undergoes deasphalting is the hydrocarbon mixture from which the above-described lighter fraction(s) has been removed, i.e. the hydrocarbon mixture is the heavier fraction obtained from fractionation. Preferably deasphalting is carried out by solvent deasphalting. A conventional solvent such as propane, butane, pentane or hexane may be used. Alternatively deasphalting may be carried out using supercritical $CO_2$. In this case, the $CO_2$ used in the process is preferably $CO_2$ generated during the generation of steam and/or during gasification.

In a further alternative, and preferred method of the invention, the method is at least partially self-sufficient or self-supporting in terms of solvent for deasphalting. Preferably therefore at least some of the solvent used for solvent deasphalting is obtained from the hydrocarbon mixture being processed. Preferably at least some of the solvent used in the deasphalting is the lighter fraction, e.g. comprising $C_{3-6}$ hydrocarbons such as propane, butane, pentane and/or hexane obtained by fractionation.

A range of different deasphalter units are commercially available. Units employing counter-current extraction methodology wherein the solvent (and deasphalted hydrocarbon) flow upwards against down flowing asphaltene may, for example, be used optionally in combination with packing. Alternatively deasphalting may be carried out using the ROSE process.

The deasphalting step of the method of the present invention produces deasphalted hydrocarbon and asphaltenes. Preferably the deasphalted hydrocarbon has an API in the range 12-18°. Preferably the deasphalted hydrocarbon comprises less than 5% wt, more preferably less than 3% wt, e.g. 0-2% wt asphaltenes.

The asphaltenes obtained in the deasphalting step undergo gasification. Commercially available gasifiers such as those available from GE or Shell may be used. Oxygen is fed into the gasifier along with the asphaltenes. The gasification reaction generates hydrogen, $H_2S$, $CO$, $CO_2$ as well as steam and/or energy. Optionally a shift reactor, as is well known in the art, is placed downstream of the gasifier. In the shift reactor CO is reacted with water to generate further $CO_2$ and $H_2$. The gas stream discharged from the gasifier, or if present Shift reactor, comprising hydrogen, $H_2S$, $CO_2$, and CO is preferably passed through a heat exchanger and further steam is generated. The operating conditions of the gasifier and/or shift reactor are preferably controlled to yield the amount of hydrogen that is necessary for upgrading.

The hydrogen from the gasifier is used for upgrading as described below. The steam is preferably injected into the formation and/or any energy produced is preferably used to generate steam that is injected into the formation. If SAGD is being used as the recovery method, the steam is injected into a formation to mobilise further hydrocarbon for recovery and the energy is used to generate steam from water for injection into a formation. If ISC is being used as the recovery method the steam is used to pre-heat formation and/or mobilise hydrocarbon in nearby SAGD operations. This is an advantage of the process of the present invention, namely it is at least partially self-sufficient or self-supporting in terms of steam generation.

In preferred methods of the invention at least some of the $CO_2$ generated in the method is captured and stored in a subterranean formation. Methods for carbon capture and storage are well established in the art and are well known to the skilled man. In preferred methods of the invention at least a portion of the $CO_2$ produced during the gasification is captured and stored. In further preferred methods of the invention at least a portion of the $CO_2$ generated during steam generation is captured and stored.

Preferably the $CO_2$ produced in the method of the invention is captured in a $CO_2$ purifier. The $CO_2$ purifier may be, for example, a $CO_2$ capture apparatus comprising an absorption tower and a regeneration tower. Such towers are conventional in the art. Preferably the $CO_2$-containing gas is contacted, typically in counter flow, with an aqueous absorbent in an absorber column. The gas leaving the absorber column is preferably $CO_2$ depleted and can be released to the atmosphere. The $CO_2$ preferably leaves the absorber column together with the absorbent. Typically the absorbent is subsequently regenerated in a regenerator column and returned to the absorber column. The $CO_2$ separated from the absorbent is preferably sent for storage, e.g. in a subterranean formation.

When ISC is used as the recovery method, and particularly when an oxygen-rich gas is used to fuel combustion, a $CO_2$-rich gas is generally produced at the vent well. Preferably at least a portion of the $CO_2$ from $CO_2$ rich gas generated during in situ combustion is captured. Still more preferably a portion of the captured $CO_2$ is reinjected into the formation and/or at least a portion of the captured $CO_2$ is stored in a formation.

The $CO_2$-rich gas produced from a vent well preferably comprises at least 50% by volume $CO_2$, more preferably at least 70% by volume $CO_2$, still more preferably at least 80% by volume $CO_2$. The amount of $CO_2$ in the $CO_2$-rich gas is preferably 50-100% by volume, preferably 60-95% by volume, still more preferably 70-90% by volume $CO_2$. The remainder of the gas generally comprises water vapour, SOx and NOx gases and hydrocarbons. Preferably at least a portion of $CO_2$ from the $CO_2$-rich gas is used to form an oxygen-rich gas for injection into the formation via an injection well. Preferably a portion of $CO_2$ from said $CO_2$-rich gas is pressurised, condensed and pumped to a formation for storage.

In the methods of the present invention, hydrogen addition occurs during the upgrading step. At least some of the hydrogen required for upgrading is hydrogen generated in the gasifying step. If necessary, the hydrogen generated in the gasifying step may be combined with an external source of hydrogen. Preferably, however, substantially all (e.g. all) of the hydrogen generated during gasification is used in the upgrading step.

Any conventional upgrading process based on hydrogen addition may be used. Preferred processes are thermally based. Preferred thermal processes include hydrocracking (e.g. ebullated bed or slurry hydrocracking) and hydrotreating (e.g. distillate hydrotreating). Particularly preferably the upgrading is carried out by hydrocracking.

Hydrocracking is a process wherein the hydrocarbon mixture is heated in the presence of an elevated partial pressure of hydrogen. The hydrogen functions to remove double bonds from the hydrocarbons present in the mixture as well as to remove sulphur and nitrogen atoms. It is a well known process in the field of petroleum chemistry and a wide range of equipment for carrying out the process is commercially available. When hydrocracking is used as the upgrading method in the process of the invention it is typically carried out a temperature of 300-450° C., more preferably 350-420° C. The pressure used is preferably 100-200 bar, more preferably 150-180 bar. A catalyst is typically employed in the process. A typical residence time may be 0.5 to 2 hours, e.g. 1 hour to 1.5 hours.

Hydrotreating is another process wherein the heavy hydrocarbon mixture is heated in the presence of hydrogen, typically in the presence of a catalyst. Sulphur is typically removed from the hydrocarbon mixture during the process. Like hydrocracking, it is a well known process in the field of petroleum chemistry and the skilled man will readily be able to identify and obtain suitable equipment for carrying out the process. When hydrotreating is used as the upgrading method in the process of the invention it is typically carried out a temperature of 350 to 420° C., more preferably 360 to 400° C. The hydrogen pressure used is preferably 30 to 100 bar, more preferably 50 to 80 bar. A catalyst will typically be employed in the process. Preferred catalysts include nickel-molybdenum and cobalt-molybdenum. A typical residence time may be 1 to 30 minutes, e.g. 5 to 15 minutes.

Upgrading may be carried out in a single step or in multiple (e.g. 2 or 3) steps. If a single step is used, the upgrading process is preferably thermal cracking. If multiple steps are used, the upgrading process preferably comprises thermal cracking and hydrotreating. Particularly preferably the upgrading comprises thermal cracking and hydrotreating.

In the method of the present invention a diluent is added to the upgraded hydrocarbon. In preferred methods of the invention the deasphalted hydrocarbon is blended with diluent prior to upgrading. In other preferred methods a diluent is added during upgrading, e.g. in between upgrading steps. Once blended with diluent, the deasphalted and/or upgraded hydrocarbon is generally referred to as syncrude.

The methods of the present invention are at least partially self-sufficient or self-supporting in terms of diluent. As described above, the diluent is preferably obtained from the hydrocarbon mixture being processed. In this sense the method of the present invention is preferably at least partially self-supporting in terms of diluent. This reduces or eliminates the need to transport and store external diluent for this purpose.

The diluent added to the upgraded and optionally deasphalted hydrocarbon preferably comprises a lighter fraction, e.g. comprising naphtha, kerosene, light gas oils and/or heavy gas oils, obtained during fractionation. The mixing of the diluent and the hydrocarbon mixture may be carried out using conventional equipment, e.g a diluent addition tank. The mixing or blending may, for example, be achieved by stirring or agitation in a vessel, using jet mixers or mixer nozzles, line mixing or pump mixing. Preferably the mixing step yields a homogenous mixture.

The hydrocarbon mixture produced by the method of the invention is preferably transportable. More preferably the hydrocarbon mixture is pumpable, e.g. it has a sufficiently low density and viscosity (e.g. at ambient conditions) to flow along a pipeline. The hydrocarbon mixture produced by the method of the invention preferably has an API gravity of at least about 5 degrees higher than that of the crude hydrocarbon mixture, e.g. an API gravity of at least about 8, 12, 15 or 18 degrees higher. In a preferred embodiment, the hydrocarbon mixture has an API gravity of greater than 20 degrees, e.g. greater than 25 or 30 degrees, e.g. up to about 35 degrees. Preferred hydrocarbon products have an API gravity of about 15-30 degrees, more preferably about 20-25 degrees.

In preferred processes of the present invention the hydrocarbon mixture produced by the method of the invention preferably has a viscosity of less than 500 cST at 7° C., more preferably less than 400 cST at 7° C., still more preferably less than 350 cST at 7° C. Preferably the viscosity of the hydrocarbon mixture is in the range 100-500 cST at 7° C., more preferably 200-400 cST at 7° C., e.g. about 300-350 cST at 7° C.

The present invention also relates to a system for carrying out the method of the invention hereinbefore described. Preferred features of the method hereinbefore described are also preferred features of the system. The well arrangement present in a preferred system is suitable for SAGD (e.g. a SAGD well pair) or in situ combustion (e.g. a row of injection wells, a row of vent wells and a production well).

The systems of the present invention comprise a well arrangement fluidly connected to a fractionator and a deasphalter unit fluidly connected to the fractionator. The deasphalter unit has an outlet for deasphalted hydrocarbon and an outlet for asphaltenes. The system further comprises a gasifier fluidly connected to the outlet for asphaltenes of the deasphalter unit and having an outlet for steam and/or a means to store energy for conversion of water into steam and an outlet for $CO_2$, an upgrader fluidly connected to the outlet for deasphalted hydrocarbon of the deasphalter unit and having an inlet for hydrogen and an outlet for upgraded hydrocarbon and a means for transporting hydrogen generated by the gasifier to the upgrader. The systems also comprise a diluent addition tank fluidly connected to the outlet for upgraded hydrocarbon of the upgrader and having an inlet for diluent and an outlet for syncrude. The systems also comprise a means for transporting at least one lighter fraction from the fractionator to the inlet for diluent of the diluent addition tank. Some preferred systems further comprise a means for transporting steam generated by the gasifier to said well arrangement and/or for transporting energy generated by the gasifier to another part of the system requiring energy.

As used herein the term "fluidly connected" refers to means to transport a fluid from a first unit to a second unit, optionally via one or more intervening units. The fluid connection may therefore be direct or indirect.

In preferred systems of the invention the upgrader is a thermal cracker and/or a hydrotreater. In one preferred system the upgrader is a thermal cracker. In another preferred system a first upgrader (e.g. a thermal cracker) is fluidly connected to a second upgrader (e.g. a hydrotreater). Thus the second upgrader is fluidly connected to the outlet for upgraded hydrocarbon of the upgrader and has an outlet for further upgraded hydrocarbon.

Preferred systems of the invention further comprise a separator for separating the recovered hydrocarbon into separated water and separated hydrocarbon, the separator being in between the well arrangement and the fractionator and having an inlet fluidly connected to the well arrangement, an outlet for separated hydrocarbon fluidly connected to the fractionator and an outlet for separated water.

Preferred systems of the invention therefore comprise:
(a) a well arrangement for a method of recovering hydrocarbon mixture comprising a production well;
(b) a separator for separating said recovered hydrocarbon mixture into separated water and separated hydrocarbon, said separator having an inlet fluidly connected to said well arrangement, an outlet for separated hydrocarbon fluidly connected to a fractionator and an outlet for separated water;
(c) a fractionator having an inlet for separated hydrocarbon fluidly connected to said well arrangement, an outlet for a heavier fraction fluidly connected to a deasphalter unit and an outlet for at least one lighter fraction;
(d) a deasphalter unit fluidly connected to said well arrangement and having an outlet for deasphalted hydrocarbon and an outlet for asphaltenes;
(e) a gasifier fluidly connected to said outlet for asphaltenes of said deasphalter unit and having an outlet for steam and/or a means to store energy and an outlet for $CO_2$;
(f) an upgrader fluidly connected to said outlet for deasphalted hydrocarbon of said deasphalter unit and having an inlet for hydrogen and an outlet for upgraded hydrocarbon;

(g) a diluent addition tank fluidly connected to the outlet for upgraded hydrocarbon of said upgrader and having an inlet for diluent and an outlet for syncrude;
(h) a means for transporting hydrogen generated by said gasifier to said inlet for hydrogen of said upgrader;
(i) a means for transporting said at least one lighter fraction from said fractionator to said separator and/or to the line transporting recovered hydrocarbon mixture to said separator; and
(j) a means for transporting said at least one lighter fraction from said fractionator to said inlet for diluent of said diluent addition tank.

Preferably the outlet for separated water is fluidly connected to a water treatment unit for cleaning water for steam generation. Preferably the water treatment unit is fluidly connected to the steam generator and said generator has an outlet fluidly connected to the well arrangement.

The systems of the invention further comprise a fractionator, the fractionator being in between the well arrangement or, when present the separator, and the deasphalter unit, and having an inlet for hydrocarbon mixture fluidly connected to the well arrangement or separator, an outlet for a heavier fraction fluidly connected to the deasphalter unit and an outlet for at least one lighter fraction. Preferably the fractionator comprises a means for transporting the at least one lighter fraction from the fractionator to the separator and/or to the line transporting recovered hydrocarbon mixture to said separator. Further preferred systems comprise a means for transporting an even lighter fraction from the fractionator to the deasphalter unit.

Yet further preferred systems comprise a diluent addition tank fluidly connected to the outlet for deasphalted hydrocarbon of the deasphalter unit and having an inlet for diluent and an outlet for syncrude. Such systems comprise:
(a) a well arrangement for a method of recovering hydrocarbon mixture comprising a production well;
(b) a fractionator having an inlet for hydrocarbon mixture fluidly connected to said well arrangement, an outlet for a heavier fraction fluidly connected to a deasphalter unit and an outlet for at least one lighter fraction;
(c) a deasphalter unit fluidly connected to said well arrangement and having an outlet for deasphalted hydrocarbon and an outlet for asphaltenes;
(d) a gasifier fluidly connected to said outlet for asphaltenes of said deasphalter unit and having an outlet for steam and/or a means to store energy and an outlet for $CO_2$;
(e) a diluent addition tank fluidly connected to the outlet for deasphalted hydrocarbon of said deasphalter unit and having an inlet for diluent and an outlet for syncrude;
(f) an upgrader fluidly connected to said outlet for syncrude of said diluent addition tank and having an inlet for hydrogen and an outlet for upgraded hydrocarbon;
(g) a diluent addition tank fluidly connected to the outlet for upgraded hydrocarbon of said upgrader and having an inlet for diluent and an outlet for syncrude;
(h) a means for transporting hydrogen generated by said gasifier to said inlet for hydrogen of said upgrader; and.
(i) a means for transporting said at least one lighter fraction from said fractionator to said inlet for diluent of said diluent addition tank.

Preferred systems of the invention further comprise a second upgrader. In systems where more than one upgrader is used, the outlet for upgraded hydrocarbon connected to the diluent addition tank may be of any upgrader in the series, but is preferably the last, e.g. the second if two are used. Preferably the inlet for diluent of the diluent addition tank is a means for transporting said at least one lighter fraction from said fractionator to said diluent addition tank(s).

A particularly preferred system of the present invention comprises:
(a) a well arrangement for a method of recovering hydrocarbon mixture comprising a production well;
(b) a separator for separating said recovered hydrocarbon mixture into separated water and separated hydrocarbon, said separator having an inlet fluidly connected to said well arrangement, an outlet for separated hydrocarbon fluidly connected to a fractionater and an outlet for separated water;
(c) a fractionator having an inlet for separated hydrocarbon fluidly connected to said separator, an outlet for a heavier fraction fluidly connected to said deasphalter unit and an outlet for at least one lighter fraction;
(d) a deasphalter unit fluidly connected to said fractionater and having an outlet for deasphalted hydrocarbon and an outlet for asphaltenes;
(e) a gasifier fluidly connected to said outlet for asphaltenes of said deasphalter unit and having an outlet for steam and/or a means to store energy and an outlet for $CO_2$;
(f) a diluent addition tank fluidly connected to the outlet for deasphalted hydrocarbon of said deasphalter unit and having an inlet for diluent and an outlet for syncrude;
(g) an upgrader fluidly connected to said outlet for syncrude of said diluent addition tank and having an inlet for hydrogen and an outlet for upgraded hydrocarbon;
(h) a second diluent addition tank fluidly connected to the outlet for upgraded hydrocarbon of said upgrader and having an inlet for diluent and an outlet for syncrude;
(i) a second upgrader fluidly connected to said outlet for syncrude of said second diluent addition tank and having an inlet for hydrogen and an outlet for further upgraded hydrocarbon;
(j) a means for transporting hydrogen generated by said gasifier to said inlet for hydrogen of each of said upgraders;
(k) a means for transporting said at least one lighter fraction from said fractionator to said separator and/or to the line transporting recovered hydrocarbon mixture to said separator; and
(l) a means for transporting said at least one lighter fraction from said fractionator to said inlet for diluent of each of said diluent addition tanks.

A further preferred system comprises a means for transporting at least one lighter fraction from said fractionator to the deasphalter unit.

Still further preferred systems comprise a $CO_2$ purifier having an inlet fluidly connected to the outlet of the gasifier and an outlet connected to a subterranean formation for $CO_2$ storage. Preferably the $CO_2$ purifier further comprises an inlet fluidly connected to a means for steam generation. Preferred systems further comprise a means for steam generation, e.g. steam boiler or once through steam generator.

When ISC is the method of recovery, the $CO_2$ purifier further comprises an inlet fluidly connected to at least one vent well of the well arrangement. Still more preferably an outlet of the purifier is connected to the injection well of the well arrangement.

DETAILED DESCRIPTION OF PREFERRED EMBODIMENTS

Figure 1:
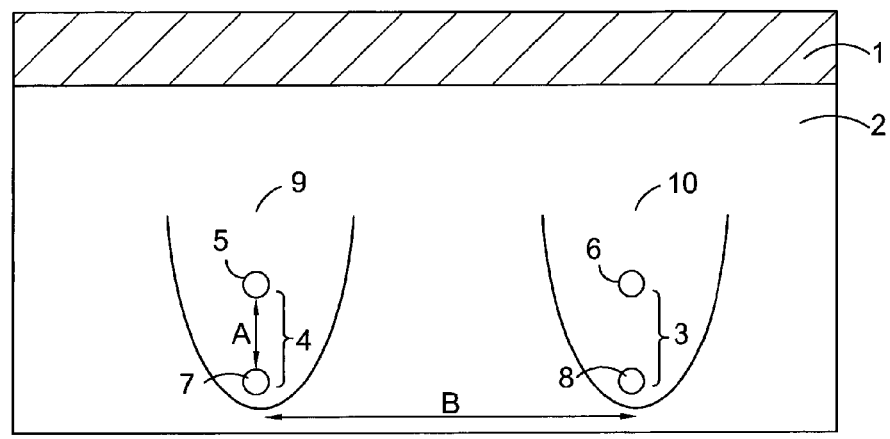
FIG. 1 is a schematic view of a cross section of an oil-bearing formation with SAGD well pairs suitable for carrying out the method of the invention.

Referring to FIG. 1 it shows a cross section of a reservoir comprising SAGD well pairs. FIG. 1 shows the reservoir shortly after SAGD is started. A covering of overburden 1 lies above the hydrocarbon-containing portion of the reservoir 2. Each SAGD well pair 3, 4 comprises an injector well 5, 6 and a producer well 7, 8. The vertical separation (arrow A) between each well pair is about 5 m. The horizontal separation (arrow B) between each well pair is about 100 m. The injector wells 5, 6 are at the same depth in the reservoir and are parallel to each other. Similarly the producer wells 7, 8 are at the same depth in the reservoir and are parallel to each other. The producer wells are preferably provided with a liner (not shown) as is conventional in the art.

In FIG. 1 steam has been injected into injector wells 5, 6 thus heated areas 9, 10 around each of the injector wells have been formed. In these areas the latent heat from the steam is transferred to the hydrocarbon and, under gravity, it drains downwards to producer wells 7, 8. From producer wells 7, 8 the mobilised hydrocarbon is pumped to the surface.

Figure 2:
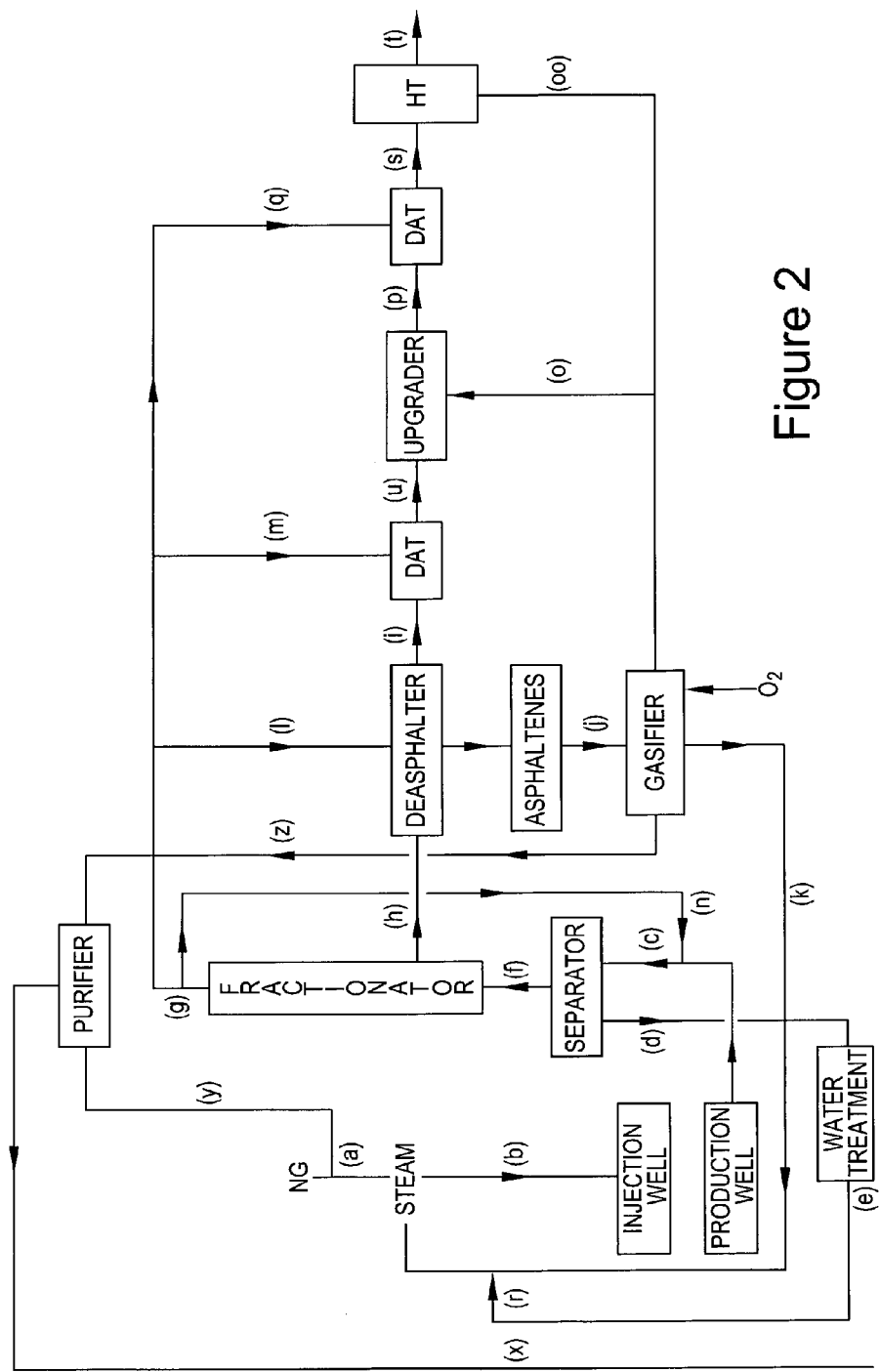
FIG. 2 is a flow diagram of a method and system of the invention showing the flow of each of hydrogen, steam, diluent, $CO_2$ and water when SAGD is the method of recovery.

Referring to FIG. 2 it shows the flow of each of hydrogen, steam, water, diluent and $CO_2$ through the method and system of the invention when SAGD is used as the method of recovering hydrocarbon mixture.

Considering first the flow of steam and water, initially steam is generated from natural gas by conventional methods (arrow a). The steam is injected via the injection wells of SAGD well pairs into a subterranean formation (arrow b) as described above in relation to FIG. 1. The steam mobilises heavy hydrocarbon present in the formation and heavy hydrocarbon is recovered at the surface from producer wells (arrow c). The mobilised hydrocarbon comprises a mixture of water and hydrocarbon and is routed to a bulk separator wherein the water and hydrocarbon are separated. Preferably diluent is added to the mixture prior to its entry to the separator (arrow n). The separated water is collected (arrow d) and sent to a treatment facility for cleaning so it can be reused for further steam generation (arrow e). The separated hydrocarbon is transported to a fractionator (arrow f) wherein naphtha, kerosene, light gas oils and/or heavy gas oils are removed (arrow g). The remaining hydrocarbon mixture (i.e. heavier fraction) is transported to a deasphalting unit (arrow h) wherein solvent deasphalting takes place. The deasphalting process produces deasphalted hydrocarbon that is transported out of the deasphalter (arrow i) and asphaltenes that are transported to a gasifier (arrow j). Gasification of the asphaltenes generates steam for use in hydrocarbon recovery and/or energy that is used to convert water to further steam (arrow k). Preferably the energy generated is used to convert the separated water from the separator into steam (arrow r). The method of the invention is advantageous because some of the energy inherently present in the hydrocarbon recovered is used to fuel the generation of steam for further hydrocarbon recovery. In this sense the method is at least partially self-supporting in terms of steam-generation.

Considering now the flow of hydrogen through the method of the invention, as described above, the asphaltenes produced in the deasphalting step are transported to a gasifier (arrow j). Oxygen is supplied to the gasifier and the gasification process produces steam and/or energy, $CO_2$ and hydrogen. The hydrogen is transported to the upgrader, typically a thermal cracker (arrow o) wherein it is used to upgrade the deasphalted hydrocarbon. The resulting upgraded hydrocarbon is transportable (arrow p). The upgraded hydrocarbon is blended with diluent in a diluent addition tank (DAT) (arrow q) to generate syncrude. The syncrude is transported to a hydrotreater (HT) (arrow s) and undergoes further upgrading to yield stable and transportable hydrocarbon (arrow t). At least some of the hydrogen required for hydrotreating is from the gasifying step (arrow oo).

Considering now the flow of diluent through the method, as described above, the separated hydrocarbon is transported to a fractionator wherein a lighter fraction comprising naphtha, kerosene, light gas oils and/or heavy gas oils are removed (arrow g). The naphtha, kerosene, light gas oil and/or heavy gas oil obtained is preferably used as the diluent that is added to the mixture of hydrocarbon and water prior to its entry to the separator (arrow n). Optionally a lighter fraction, e.g. comprising propane, butane, pentane and/or hexane, may also be used as the solvent in the deasphalting process (arrow l). Moreover the naphtha, kerosene, light gas oil and/or heavy gas oils obtained from the fractionator is used as a diluent for the deasphalted hydrocarbon mixture (arrow m). Thus the deasphalted hydrocarbon mixture produced in the deasphalter unit is routed to a diluent addition tank (DAT) (arrow i) and blended with diluent (arrow m). The blend of diluent and hydrocarbon mixture that results is then transported to the upgrader (arrow u). As described above, further diluent is added to the upgraded hydrocarbon prior to its further upgrading in the hydrotreater. The recycling of the naphtha, kerosene, light gas oil and heavy gas oil from the heavy hydrocarbon for these purposes is highly advantageous. It avoids the need to transport and store an external diluent specifically for these purposes. Additionally because the diluent is generated from the hydrocarbon mixture into which it is being reintroduced, it is unlikely to cause any instability problems. A further advantage of the method is the compounds present in the heavy hydrocarbon are used in its processing. As above therefore, the method is at least partially self-supporting in terms of production of solvent for solvent deasphalting and/or diluent for addition to crude hydrocarbon mixture and/or production of syncrude.

Considering now the flow of $CO_2$ through the method, $CO_2$ is generated at several points, namely during conversion of natural gas to steam and during gasification of asphaltenes. The $CO_2$ is captured and transported (arrows y, z) to a purifier where it is cleaned. The $CO_2$ is then pressurised, condensed and pumped to available $CO_2$ subterranean formation sites (arrow x). A further advantage of the method of the invention is that less $CO_2$ is released to the atmosphere than in traditional SAGD based processes.

Figure 3:
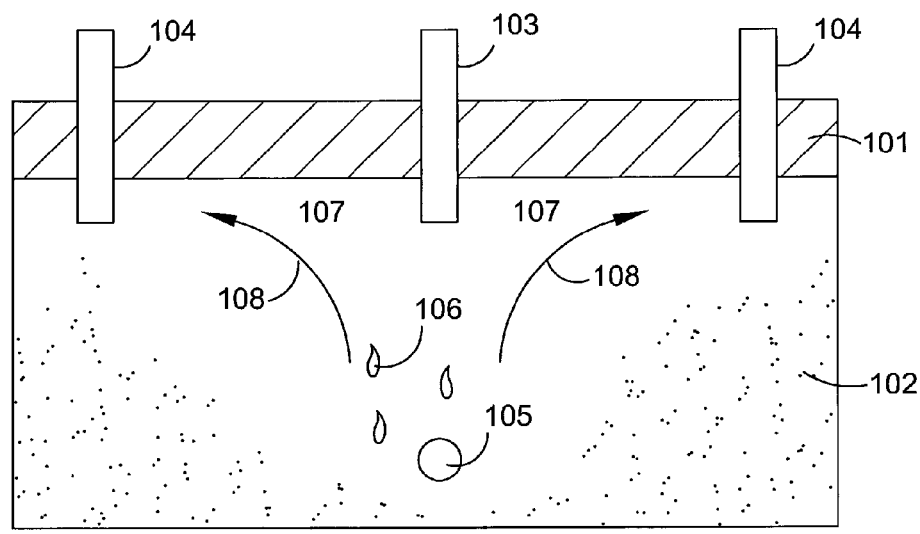
FIG. 3 is a schematic view of a cross section of an oil-bearing formation with a well arrangement for carrying out in situ combustion.

Referring to FIG. 3 it shows a cross section of a reservoir comprising a well arrangement suitable for carrying out in situ combustion. An overburden 101 lies above the oil-bearing formation 102. A row of vertical injection wells 103 are drilled downward through the overburden 101. The injection wells 103 are completed in the oil-bearing formation 102. Vent wells 104 are also drilled through the overburden 101 and are completed in the oil-bearing formation 102, in an upper portion thereof. The vent wells 104 are drilled laterally spaced from the injection wells 103 so that the rows of injection wells 103 and rows of vent wells 104 are parallel. The production well 105 is substantially horizontal and is aligned with, and positioned below, the row of injection wells 103. The production well is located in a lower region of the oil-bearing formation. The production well is preferably provided with a liner (not shown) as is conventional in the art.

In most cases it will be desirable to preheat the formation prior to commencing in situ combustion. This prepares the cold heavy hydrocarbon for ignition and develops enhanced hydrocarbon mobility in the reservoir. Preheating may be achieved by injecting steam through the injection wells 103 and optionally through the vent wells 104 and/or the production well 105. It is generally desirable to inject steam through all types of wells so fluid communication between the injection well 103, vent well 104 and production well 105 is achieved. Oil may be recovered in production well 105 during this preheating step. When the reservoir is sufficiently heated, combustion may be started and hydrocarbon recovery commenced.

Oxygen-containing gas is injected into injection wells 103 to initiate combustion. Thereafter a combustion chamber forms around each injection well 103. The combustion chambers naturally spread and eventually form a continuous chamber that links all of the injection wells 103. The front of the combustion zone heats heavy hydrocarbon in its vicinity thereby increasing the hydrocarbon mobility and enabling it to flow. Under the forces of gravity, the heavy hydrocarbon 106 flows downwards towards production well 105. From there the heavy hydrocarbon is pumped to the surface facilities.

At the same time as combustion, a gas layer 107 forms at the upper surface of the oil-bearing formation. This gas layer comprises $CO_2$ rich combustion gases (their flow is represented by arrows 108) as well as $CO_2$ injected as part of the oxygen-containing gas. A small amount of oxygen may also be present in gas layer 107. The gas will establish communication with the vent wells 104. Preferably the $CO_2$-rich gases from the vent wells 4 are captured at the surface where they are treated as discussed below. After the combustion front has advanced a certain distance from the injection wells, the injection of oxygen containing gas is stopped. This will terminate the in situ combustion process.

Figure 4:
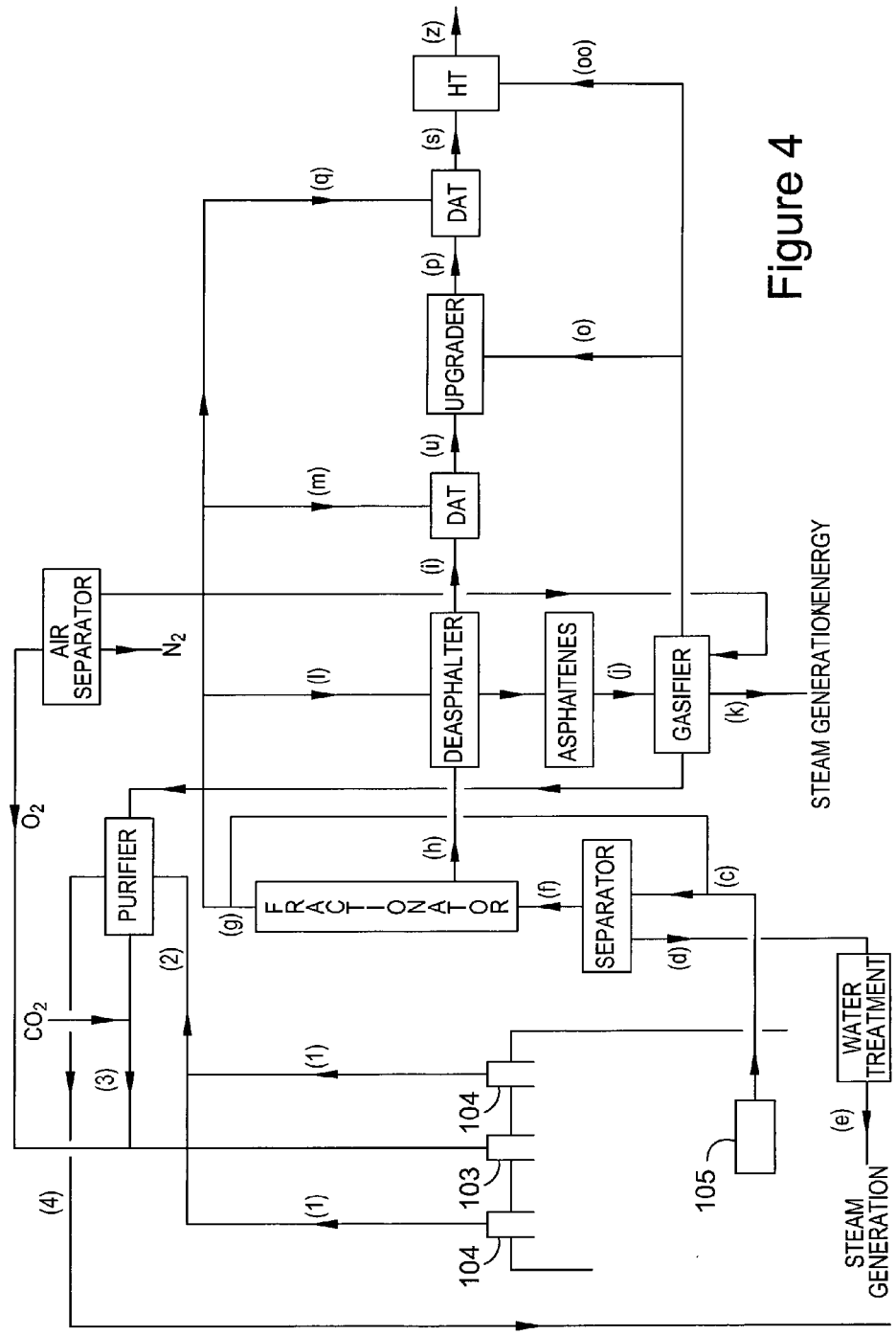
FIG. 4 is a flow diagram of a method and system of the invention showing the flow of each of hydrogen steam, diluent, $CO_2$ and water when in situ combustion is the method of recovery.

Referring to FIG. 4 it shows the flow of each of hydrogen, steam/energy, water, diluent and $CO_2$ through the method of the invention when in situ combustion is used as the method of recovering hydrocarbon mixture. Many features of this method are the same as those discussed above in relation to the method based on SAGD. There are two main differences and these are discussed below.

First when in situ combustion is used as the method of recovering hydrocarbon, steam is not continuously utilised in the process. Steam is generally used to pre-heat the formation prior to starting to combustion. Steam generated by gasification is therefore used for preheating. Alternatively the steam may be used in a SAGD method being carried out on a well in the vicinity. Preferably, however, gasification generates energy that can be used in another step of the process.

Second in situ combustion generates large amounts of $CO_2$. The $CO_2$ rich gas is transported out of the formation via vent wells 104 (arrow 1) to the purifier (arrow 2). Once cleaned, the $CO_2$ may be reinjected into the formation as part of the oxygen-containing gas for fueling in situ combustion (arrow 3). Alternatively or additionally the $CO_2$ may be stored in a formation (arrow 4).

The method of the present invention has several advantages including:

Gasification of asphaltenes obtained from the hydrocarbon mixture generates hydrogen for upgrading the hydrocarbon mixture.

Gasification of asphaltenes obtained from the hydrocarbon mixture generates steam and/or energy for generation of steam for use in further hydrocarbon recovery Water for steam generation can be recycled water obtained by separating out and cleaning the water produced from the hydrocarbon formation along with the hydrocarbon mixture Fractionation of the hydrocarbon mixture produces a lighter fraction, e.g. naphtha, kerosene and/or light gas oils, that can be used as solvent in the deasphalting process and/or as diluent for the deasphalted and/or upgraded hydrocarbon, e.g. in the generation of syncrude Fractionation of the hydrocarbon mixture produces a lighter fraction, e.g. naphtha and/or light gas oils, that can be used as diluent for the crude heavy hydrocarbon mixture to improve the separation process.

Little, if any, $CO_2$ is released to the atmosphere. Instead the $CO_2$ is captured and stored in a formation.

The method of the invention is at least partially self-sufficient or self-supporting. The hydrocarbon mixture recovered from the subterranean formation provides at least some of each of hydrogen for upgrading, solvent for deasphalting, diluent for the generation of syncrude as well as at least some of the water and steam and/or energy required for hydrocarbon recovery.

The invention claimed is:

1. A method of recovering and processing a hydrocarbon mixture from a subterranean formation, comprising:
    (i) mobilising said hydrocarbon mixture;
    (ii) recovering said mobilised hydrocarbon mixture;
    (iii) fractionating said recovered hydrocarbon mixture thereby producing a heavier fraction and at least one lighter fraction from said recovered hydrocarbon mixture, wherein said lighter fraction comprises naphtha, kerosene and light gas oils;
    (iv) deasphalting said heavier fraction thereby producing deasphalted hydrocarbon and asphaltenes;
    (v) gasifying said asphaltenes in a gasifier thereby generating hydrogen, steam and/or energy and $CO_2$;
    (vi) adding a first diluent to said deasphalted hydrocarbon after deasphalting in step (iv), prior to upgrading;
    (vii) upgrading said deasphalted hydrocarbon by adding hydrogen; and
    (viii) adding a second diluent to said upgraded hydrocarbon,
    wherein at least some of said hydrogen added to the deasphalted hydrocarbon is the hydrogen generated in the gasifying step and wherein at least some of said first diluent added to the deasphalted hydrocarbon and at least some of said second diluent added to the upgraded hydrocarbon comprises the lighter fraction obtained directly during fractionating.

2. A method as claimed in claim 1, wherein said upgrading comprises thermal cracking.

3. A method as claimed in claim 1, wherein said upgrading comprises hydrotreating.

4. A method as claimed in claim 1, wherein said mobilised hydrocarbon mixture comprises water and hydrocarbon and said mixture undergoes separation to produce separated water and separated hydrocarbon.

5. A method as claimed in claim 4, wherein a third diluent is added to said mobilised hydrocarbon mixture prior to said separation.

6. A method as claimed in claim 5, wherein said method is at least partially self-sufficient in terms of diluent for addition to said mobilised hydrocarbon mixture.

7. A method as claimed in claim 5, wherein said third diluent comprises a lighter fraction obtained directly during fractionating.

8. A method as claimed in claim 4, wherein said separated water is cleaned and recycled for steam generation.

9. A method as claimed in claim 8, which is at least partially self-sufficient in terms of water for steam generation.

10. A method as claimed in claim 1, wherein said deasphalting is solvent deasphalting.

11. A method as claimed in claim 10, wherein said method is at least partially self-sufficient in terms of solvent for deasphalting.

12. A method as claimed in claim 11, wherein the solvent used in said deasphalting is a lighter fraction obtained directly during fractionating.

13. A method as claimed in claim 12, wherein said lighter fraction further comprises propane, butane, pentane and/or hexane.

14. A method as claimed in claim 10, wherein the solvent used in said deasphalting is $CO_2$ generated during the generation of steam and/or during gasification.

15. A method as claimed in claim 1, wherein at least some of the $CO_2$ generated in the method is captured and stored in a subterranean formation.

16. A method as claimed in claim 1, wherein at least a portion of the $CO_2$ produced during said gasification is captured and stored.

17. A method as claimed in claim 1, wherein said method of recovery is steam assisted gravity drainage (SAGD).

18. A method as claimed in claim 17, wherein steam is generated in the gasifying step and the method further comprises injecting the steam into said formation and/or wherein energy is generated in the gasifying step and the method further comprises applying said energy to generate steam and injecting said steam into said formation.

19. A method as claimed in claim 1, wherein said method of recovery is in situ combustion.

20. A method as claimed in claim 19, further comprising capturing at least a portion of $CO_2$ from $CO_2$ rich gas generated during the in situ combustion.

21. A method as claimed in claim 20, further comprising reinjecting a portion of said captured $CO_2$ into the formation and/or storing at least a portion of said captured $CO_2$ in a formation.

22. A system for recovering and processing a hydrocarbon mixture comprising:
   (a) a well arrangement comprising a production well for use in recovering the hydrocarbon mixture;
   (b) a fractionator having an inlet for the hydrocarbon mixture fluidly connected to said well arrangement, an outlet for a heavier fraction fluidly connected to a deasphalter unit and an outlet for at least one lighter fraction, wherein the deasphalter unit is fluidly connected to the fractionator and has an outlet for deasphalted hydrocarbon and an outlet for asphaltenes;
   (c) a gasifier fluidly connected to said outlet for asphaltenes of said deasphalter unit and having an outlet for steam and/or storage for energy produced during gasification, an outlet for hydrogen generated during gasification and an outlet for $CO_2$;
   (d) a first diluent addition tank fluidly connected to the outlet for deasphalted hydrocarbon of said deasphalter unit and having an inlet for diluent;
   (e) a first upgrader fluidly connected to said outlet for deasphalted hydrocarbon of said deasphalter unit and having an inlet for hydrogen and an outlet for upgraded hydrocarbon;
   (f) a second diluent addition tank fluidly connected to the outlet for upgraded hydrocarbon of said first upgrader and having an inlet for diluent and an outlet for syncrude;
   (g) a line for transporting the hydrogen generated by said gasifier to said inlet for hydrogen of said first upgrader; and
   (h) a line for transporting said at least one lighter fraction from said fractionator directly to said inlet for diluent of each of said first and second diluent addition tanks.

23. A system as claimed in claim 22, further comprising a second upgrader fluidly connected to said outlet for syncrude of said second diluent addition tank and having an inlet for hydrogen and an outlet for further upgraded hydrocarbon.

24. A system as claimed in claim 23, further comprising a line for transporting hydrogen generated by said gasifier to said inlet for hydrogen of said second upgrader.

25. A system as claimed in claim 22, further comprising a separator for separating said recovered hydrocarbon into separated water and separated hydrocarbon, said separator being in between said well arrangement and said fractionator and having an inlet fluidly connected to said well arrangement, an outlet for separated hydrocarbon fluidly connected to said fractionator and an outlet for separated water.

26. A system as claimed in claim 25, wherein said outlet for separated water is fluidly connected to a water treatment unit for cleaning water for steam generation.

27. A system as claimed in claim 25, further comprising a line for transporting said at least one lighter fraction from said fractionator to said separator and/or to the line transporting recovered hydrocarbon mixture to said separator.

28. A system as claimed in claim 22, further comprising a line for transporting said at least one lighter fraction from said fractionator to said inlet of said first diluent addition tank.

29. A system as claimed in claim 22, further comprising:
   a separator for separating said recovered hydrocarbon mixture into separated water and separated hydrocarbon, said separator having an inlet fluidly connected to said well arrangement, an outlet for separated hydrocarbon fluidly connected to a fractionater and an outlet for separated water;
   a second upgrader fluidly connected to said outlet for syncrude of said second diluent addition tank and having an inlet for hydrogen and an outlet for further upgraded hydrocarbon; and
   a line for transporting said at least one lighter fraction from said fractionator to said separator and/or to the line transporting recovered hydrocarbon mixture to said separator.

30. A system as claimed in claim 22, further comprising a line for transporting at least one lighter fraction from said fractionator to said deasphalter unit.

31. A system as claimed in claim 22, further comprising a $CO_2$ purifier fluidly connected to said outlet for $CO_2$ of said gasifier and an outlet connected to a subterranean formation for $CO_2$ storage.

32. A system as claimed in claim 22, comprising a line for transporting steam generated by said gasifier to said well arrangement.

33. A system as claimed in claim 22, wherein said well arrangement comprises an injection well and at least one vent well for carrying out in situ combustion.

34. A system as claimed in claim 33, wherein said vent well is fluidly connected to said $CO_2$ purifier.

35. A system as claimed in claim 33, wherein an outlet of said $CO_2$ purifier is connected to said injection well.

* * * * *